United States Patent Office 2,951,890
Patented Sept. 6, 1960

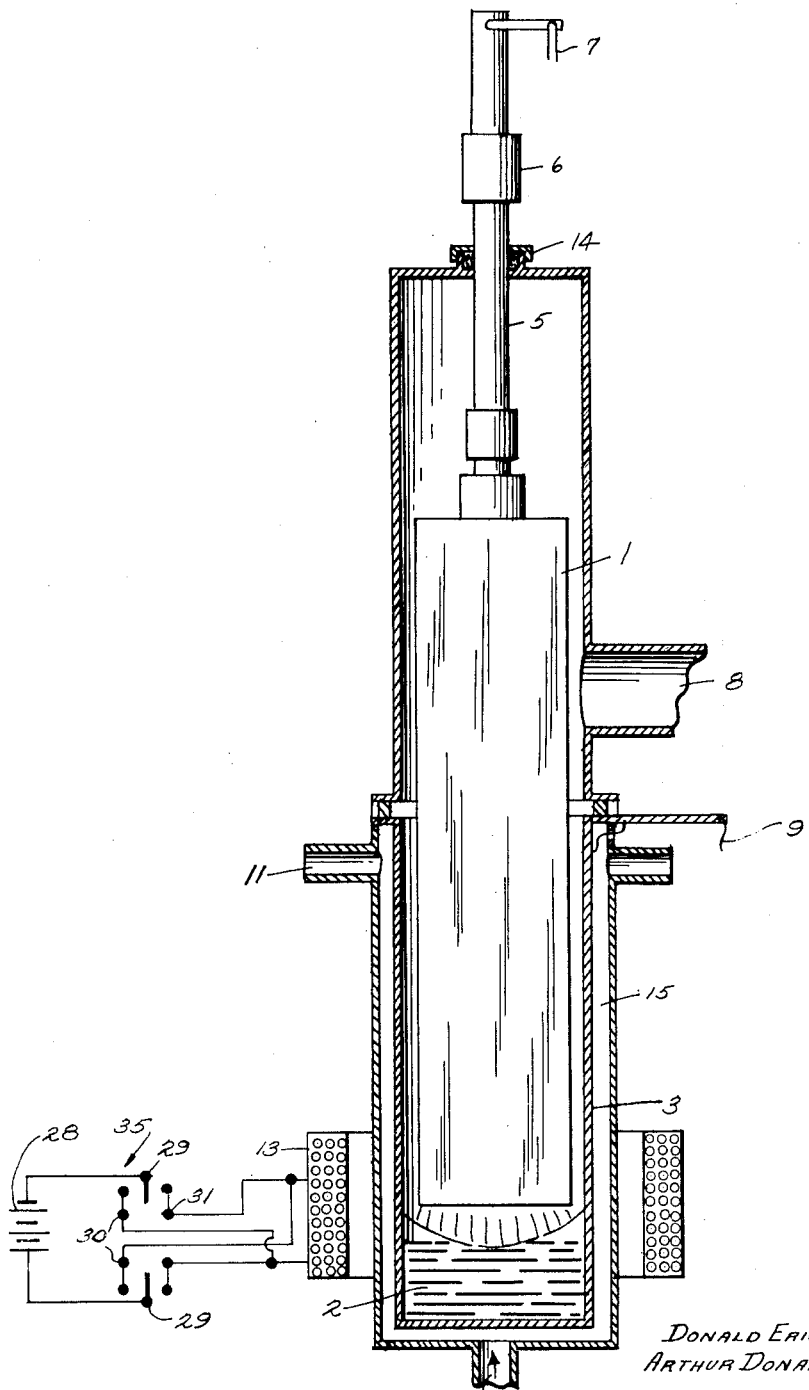

2,951,890

METHOD OF OPERATING AN ELECTRIC ARC FURNACE

Donald Eric Yeomans and Arthur Donald Busby, Birmingham, England, assignors to Imperial Chemical Industries Limited, London, England, a corporation of Great Britain Filed Apr. 9, 1958, Ser. No. 727,251

Claims priority, application Great Britain Apr. 11, 1957

5 Claims. (Cl. 13—34)

This invention relates to the operation of an electric arc furnace and is especially, though not exclusively, concerned with arc melting furnaces employing a consumable electrode of highly reactive metal, e.g. titanium, in which the melting is carried out under vacuum.

For the purpose of arc control it is customary in furnaces of this kind to apply a magnetic field in the axial direction of the furnace in order to prevent arcing between the electrode and the copper walls of the furnace. At present the magnetic field is produced by means of coils surrounding the furnace and carrying direct current.

Even with the above-mentioned precaution, circumstances still arise in which control of the arc is temporarily lost, and in order to ensure more reliable arc control, it is desired to employ more intense magnetic fields. However, upon increasing the intensity of the magnetic field to a value suitable for arc stabilisation, it is found that stirring of the molten pool of metal, which normally is an advantage, increases above a manageable limit and a vortex of metal builds up which tends to enter the space between the sides of the electrode and the walls of the furnace. Again, the excessive stirring causes undesirable heat loss from the pool.

According to the present invention, a method of operating an electric arc furnace comprises applying to the interior of the furnace a magnetic field of sufficient intensity to stablise the arc, the direction of which field is reversed at sufficient frequency to reduce the stirring effect of the field and prevent vortex formation in the pool.

Preferably the invention is applied to the melting of refractory metals or alloys of high chemical reactivity, e.g. titanium and zirconium, by the consumable electrode technique and is carried out in vacuo, i.e. under such pressure conditions that the arc has a diffuse character. Pressures of half a millimetre or less are especially suitable for this purpose.

It should be emphasised that in accordance with the present invention, it is envisaged that the time cycle of the magnetic field, i.e. the distance along the time axis between corresponding points on the field/time graph, ranges from about 0.1 second to about 5 seconds, preferably 0.1 to 2 seconds, and for this purpose use is made of direct current which is reversed at suitable frequency. It will be appreciated that the frequency of reversal of the current in the coils must not be so high that eddy currents are formed in the copper walls of the furnace. Thus, for example, with the use of alternating currents at a frequency of 50 cycles per second, it is found that due to the formation of eddy currents, the magnetic field in the interior of the furnace drops substantially and may even be reduced to zero.

By the employment of a magnetic field reversed at suitable frequency, it is found possible to increase the intensity of the field since the stirring action of the field in one direction is counteracted when the field is reversed, so that during no part of the cycle can the metal in the pool build up into a substantial vortex and heat losses are reduced. Instead, a mild turbulence is obtained which provides a mixing of the melt. Thus, whereas titanium melting furnaces have in the past operated with a current in the field coils of 2 amperes, for a given number of turns, currents of up to 10 amperes may now be employed, the time cycle of the field being 0.75 second for a current of 10 amperes.

Since the intensity of the magnetic field may be thus increased, greater control may be exerted upon the electric arc and many undesirable side effects of the arc are reduced or eliminated. In this connection, mention may be made of one undesirable effect which has been noticed in industrial operations wherein, due to the nature of the atmosphere inside the furnace and the magnetic conditions prevailing therein, a glow discharge is obtained between the electrode and the walls of the furnace. The presence of this glow discharge is very serious since a large proportion of the current fed to the furnace will by-pass the arc and will travel through the glow discharge. In severe cases this may result in a reduction in melting rate almost to zero, which is detrimental to the structure of the ingot produced. By operating according to this invention, however, the tendency for glow discharge to occur is appreciably reduced.

A further advantage of the invention is that the resulting ingots have very good surfaces.

In order that the invention may be more clearly understood, a preferred example will now be described with reference to the single figure of the accompanying drawing which shows a schematic sectional elevation of an electric arc furnace. The electric arc furnace consists essentially of a water-cooled copper crucible 3, the cooling water inlet and outlet connections 10 and 11 supplying water to jacket 15. An ingot 2, contained within the crucible, is obtained by melting a consumable electrode 1 by means of an electric arc discharging between the surface of the ingot and the consumable electrode, electrical connections being made to the crucible and the electrode respectively at points 9 and 7. The electrode is carried by an electrode supporting rod 5, which passes through a gas-tight seal 14. As melting of the consumable electrode proceeds, the level of the ingot in the crucible rises and in order to maintain a constant arc length, the electrode is raised by means of a raising and lowering device 6. Advantageously, melting is carried out in a vacuum, and for this purpose connection 8 is provided.

The arc discharging between the ingot and the consumable electrode is stabilized by means of a magnetic field co-axial with the crucible generated by coil 13, consumable electrode and ingot, the magnetic field being frequently reversed to reduce stirring effects produced by the field and to prevent excessive vortex formation in the molten ingot. In the embodiment illustrated, the magnetic field is energized using direct current which is reversed within the range of 0.1 to 5 seconds, and preferably within the range of 0.1 to 2 seconds. The electrical circuit shown provides for this and includes a battery 28 (and, of course, a D.C. generator could be substituted) and a switch shown generally at 35. The switch includes contacts 30 and 31 and central arms 29. It will be obvious that when the central arms 29 engage the contacts 30, D.C. current will flow through the coils in one direction and when they engage the contacts 31, current will flow in the opposite direction. By moving the contacts from left to right and back again, the D.C. current in the coils and hence the field generated thereby will be reversed. The switch can be operated manually or by any suitable mechanism.

We claim:

1. A method of furnace arc melting a metal in vacuo in a crucible of electrically conductive material which comprises applying to the interior of the furnace an axial magnetic field of sufficient intensity to stablise the arc, reversing said field at a frequency sufficiently high to reduce the stirring effect of said field and prevent excessive vortex formation in the molten metal, said frequency being sufficiently low to allow penetration of the field through the crucible wall despite the inductance effect of the crucible material.

2. A method of furnace arc melting in vacuo according to claim 1, which comprises employing a consumable electrode of a refractory metal of high chemical reactivity.

3. A method according to claim 2 in which the consumable electrode is of titanium or a titanium-base alloy.

4. A method according to claim 1 in which the time cycle of the applied field is from 0.1 to 5 seconds.

5. A method according to claim 1 in which the time cycle is 0.75 second.

References Cited in the file of this patent

UNITED STATES PATENTS

| | | |
|---|---|---|
| 1,939,623 | Clamer | Dec. 12, 1933 |
| 2,040,215 | Rava | May 12, 1936 |
| 2,800,519 | Garmy | July 23, 1957 |
| 2,852,586 | Steele | Sept. 16, 1958 |